July 11, 1950          L. D. JAFFE          2,514,396
SAFETY ATTACHMENT FOR CONTROL MECHANISM
Filed Oct. 30, 1946
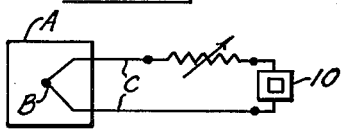
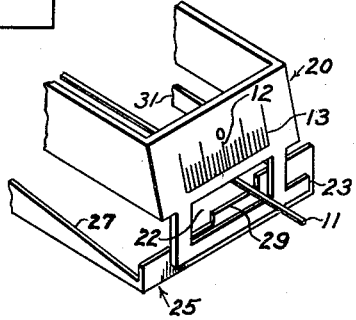
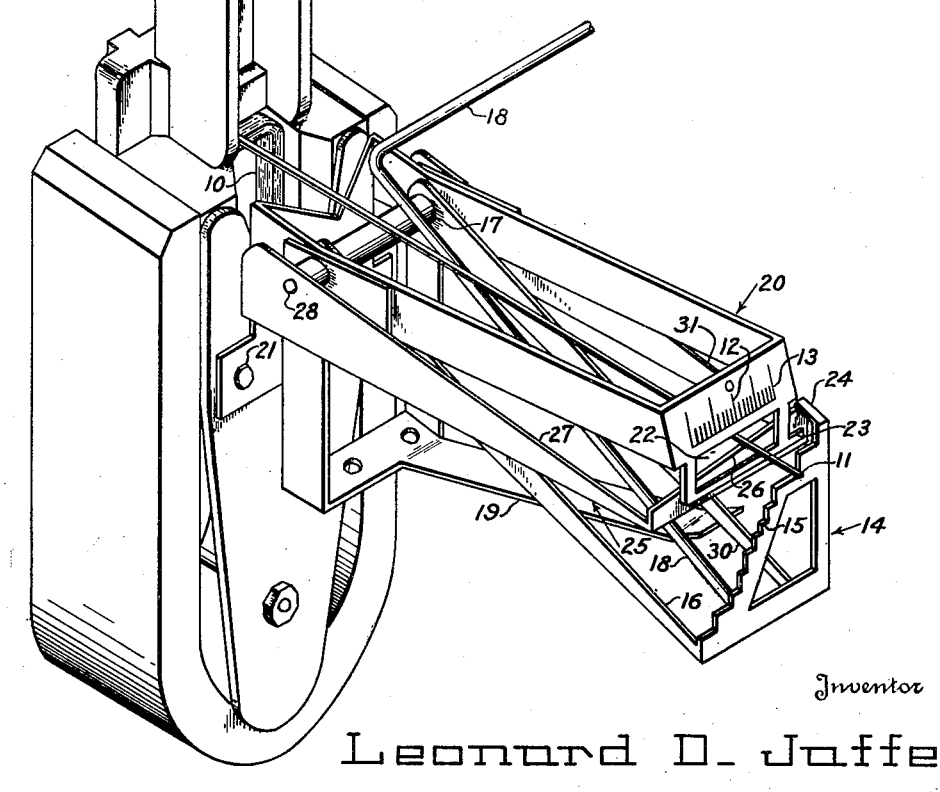
Inventor
Leonard D. Jaffe
By G. J. Vossenick, J. H. Church & H. E. Thibodeau
Attorneys Patented July 11, 1950

2,514,396

UNITED STATES PATENT OFFICE 2,514,396

SAFETY ATTACHMENT FOR CONTROL MECHANISM

Leonard D. Jaffe, Somerville, Mass.

Application October 30, 1946, Serial No. 706,787

11 Claims. (Cl. 236—70)

(Granted under the act of March 3, 1883, as amended April 30, 1928; 370 O. G. 757)

The invention described herein may be manufactured and used by or for the Government for governmental purposes, without the payment to me of any royalty thereon.

Certain control mechanisms, of the potentiometer type, operate to change the condition of a controlled element by periodic detection of the variation from or about some neutral position of an indicating element such as a galvanometer pointer, the position of such pointer being in turn substantially determined by the output of a condition measuring device such as a thermocouple.

In the event of failure of the condition measuring device or of the connections between the measuring device and the indicating element, the latter generally responds to such failure by fluctuation about its neutral position. Or, in other situations, it may be desired to decrease the damping of the indicating element in response to a change in condition of the controlled element, thus producing an increase in amplitude of fluctuation of the indicating element. In such situations the control mechanism, operating periodically in response to the instantaneous positions of the indicating element, may very well receive successive control impulses of the same direction causing the controlled element to "run-away." For example, in the case of an automatic temperature-controlled furnace, the control mechanism may, in the event of failure, operate in a "run-away" direction and cause the temperature of the furnace to rise beyond safe limits.

The desirability of an auxiliary safety attachment for such control mechanism is obvious in case of failure of the condition measuring device or connections between the measuring device and the indicating element, or upon increase of amplitude and/or rate of fluctuation of the indicating element. In the past this has been accomplished by various means many of which introduce error into the control mechanism while others involve complexity of construction and operation.

Accordingly, it is an object of this invention to provide a simple yet effective auxiliary attachment which will act upon the indicating element of a galvanometer type control mechanism, and guide the control mechanism in a desired direction upon the occurrence of any failure in the indicating circuit or other cause which produces an increase in amplitude of fluctuation of the indicating element about its neutral position.

The specific nature of the invention as well as other objects and advantages thereof will clearly appear from a description of a preferred embodiment as shown in the accompanying drawings in which:

Fig. 1 is a perspective view of the controller mechanism.

Fig. 2 is a perspective view showing a modification of the clamping unit.

Fig. 3 is a diagrammatic view of an automatic temperature-controlled furnace.

The invention comprises an auxiliary attachment for certain well known measuring and control apparatus, particularly such as that described in Letters Patent No. 1,842,371 issued January 19, 1932, No. 1,898,124 issued February 21, 1933, and No. 1,946,280 issued February 6, 1934, all in the name of Thomas R. Harrison.

It should be understood that while the invention is described as applying particularly to instruments manufactured under the above-mentioned patents, it is equally applicable to any instrument in which the control means is initiated by the deviation of a galvanometer pointer from a neutral or central position.

The basic idea of including a safety attachment for thermocouple-operated temperature control instruments is not necessarily limited to those instruments having a galvanometer needle as the indicating element but other types as well, such as for instance those employing an indicating quantity derived from a potential on the control grid of an electronic tube. However, for the purposes of an explanation of the invention, the description will be confined to a galvanometer type control instrument used to operate a temperature-controlled furnace A having a thermocouple B assembled thereto as shown diagrammatically in Fig. 3.

Referring to Fig. 1 there is shown the galvanometer portion of an otherwise conventional temperature controller. A galvanometer coil 10 is electrically connected by means of a circuit C to the furnace thermocouple B and is provided with a conventional needle pointer 11 as the indicating element.

The electrical connections previously mentioned are such that when the temperature of the furnace control element is identical with the control temperature desired, the pointer 11 is located at a central position 12 indicated on a fixed scale 13.

The correlation between the galvanometer pointer 11 and the furnace control mechanism (not shown) is accomplished by a sensing table 14 having a cam surface disposed immediately below pointer 11. Such cam surface may comprise successive steps 15 as shown in Fig. 1 or may be a continuous slope, but in either case the direction of the cam surface is upward and to the right for a purpose to be explained. Sensing table 14 is provided with a pair of spaced arms 16 and 30 which are pivotally mounted in the controller as shown at 17. Periodically, the sensing table 14 is pivoted downwardly by means of a lever 18 attached thereto which is in turn operated by a conventional cam and gear mechanism (not shown). The return of sensing table 14 to a new sensing position is accomplished through the resilient action of a leaf spring 19.

To prevent undue stress on pointer 11 due to the upward force exerted by sensing table 14 when engaged thereby, and furthermore, to insure against horizontal movement of pointer 11 while so engaged, there is provided a stop member 20 which is fixedly secured in relation to sensing table 14 as shown at 21 as by a bolt. A rectangular opening 22 in stop member 20 allows a portion of pointer 11 to protrude therethrough for contact with sensing table 14. Scale 13 is conveniently inscribed on the front face of stop 20. Leaf spring 19 may be formed integral with stop member 20 as shown in Fig. 1. An extension 23 is provided on the lower portion of the front of stop member 20 for engaging a projecting arm 24 extending from the upper right hand corner of sensing table 14 and thereby stopping the downward travel of the latter.

The mechanism thus far mentioned is conventional and has been described substantially as it appears in Letters Patent No. 1,946,280 issued February 6, 1934, to Thomas R. Harrison. In accordance with this invention however, an auxiliary element is provided in the form of a clamping table 25 comprising a sloped cam 26 and a pair of spaced arms 27 and 31 by means of which the unit 25 is pivotally mounted in the controller as shown at 28. Sloped cam 26 is positioned to underlie pointer 11 and be coextensive with the total path of movement thereof. Clamping table 25 is actuated by spring means (not shown) in such manner as to allow sloped cam 26 to move upwardly somewhat ahead of sensing table 14 and as a result the former clamps galvanometer pointer 11 first. The downward movement of clamping table 25 is controlled by projecting arm 24 of sensing table 14 which contacts the upper right hand corner of clamping table 25 as sensing table 14 moves in a downward direction. However, it should be distinctly understood that the operation of clamping table 25 does not interfere with accurate operation of sensing table 14. Accordingly, sensing table 14 assumes its proper upward position corresponding to the position in which galvanometer pointer 11 is held by clamping table 25.

It will be readily apparent that the amount of upward movement of sensing table 14 is determined by the lateral deflection of galvanometer pointer 11 at the moment that sensing table 14 pivots upwardly. That is, if galvanometer pointer 11 is to the right of neutral point 12, the upward movement of sensing table 14 will be quite small. On the other hand, if pointer 11 is to the left of neutral position 12 appreciable upward movement of sensing table 14 will occur. Sensing table steps 15 are proportioned relative to the deflection of galvanometer pointer 11 so that any desired unit of galvanometer deflection will determine a corresponding fixed amount of upward travel of sensing table 14. Such upward movement is applied through well known mechanisms (not shown) to produce a control action on the element being controlled, here upon a furnace, and such control mechanism is so arranged that corresponding to left or right departures of galvanometer pointer 11 from neutral position 12, the heat input to the furnace will be increased or decreased respectively as desired.

In accordance with this invention the upper front surface of clamping table 25 is so designed that one portion thereof underlying approximately half of the pointer travel will tend to pass through the plane of movement of pointer 11 prior to the remaining portions of clamping table 25. As shown in Fig. 1, this requirement can be met by sloped cam surface 26. In the modification shown in Fig. 2, a stepped surface 29 also meets the aforestated requirement. Obviously a variety of configurations may be selected which will fulfill the requirements. As shown in Fig. 1, the slope of cam 26 may run downwardly from right to left, being preferably selected in accordance with the direction of control resulting from a right or left hand displacement of galvanometer pointer 11 from neutral position 12. In most control mechanisms there is a "run-away" direction of control and a "safe" direction of control. For example, in the specific example of a controlled furnace, the "run-away" direction is that which tends to increase the heat input to the furnace while the "safe" direction is that which tends to decrease the heat input to the furnace. Accordingly, the direction of slope of cam 26 when used as a safety attachment is selected with respect to the electrical circuit controlling galvanometer 10 so that the high portion of safety cam 26 will underlie the deflection of pointer 11 corresponding to a "safe" direction of control. In both Fig. 1 and Fig. 2, it will be assumed that deflection of galvanometer pointer 11 to the right will produce control effects tending to reduce the heat input to the furnace and thus be in a "safe" direction of control, while deflections to the left will tend to increase the heat input to the furnace and thus be in a "run-away" direction.

The safety attachment described above is particularly effective in directing the control mechanism in a safe direction of control when failures occur which produce an increase in amplitude and/or in rate of fluctuation of galvanometer pointer 11 about its neutral position 12. Such increase will generally occur upon failure of the thermocouple B or the electrical connections of circuit C between the thermocouple and the galvanometer. It should be noted that in the conventional thermocouple-galvanometer circuit, the galvanometer is relatively highly-damped when the circuit is complete and functioning properly; however, any interruption of the thermocouple circuit considerably reduces the electrical damping of the galvanometer and permits oscillations of the pointer to persist to a much greater extent than when the thermocouple circuit is closed during normal operation.

Assuming a failure to occur and the galvanometer pointer to be oscillating at an increased amplitude and/or rate of fluctuation, the remainder of the control mechanism of course continues to function in an otherwise normal manner and periodically sensing table 14 is raised to determine the position of pointer 11 at that instant and to effect a control action responsive thereto. With cam 26 shaped as described, and assuming a large number of periodic upward operations of sensing table 14, pointer 11 will considerably more often be engaged and clamped by the high side of cam 26 and accordingly will more often be clamped in a position to the right of neutral point 12. Thus sensing table 14 will effect a control action tending to reduce the heat input to the control unit.

It should be noted that the auxiliary attachment in no way interferes with the normal operation of the step table inasmuch as the usual movement of galvanometer pointer 11 is highly-damped and safety cam 26 thus clamps it in its proper indicating position. In such position, pointer 11 is contacted by sensing table 14 in the regular manner.

It should be further obvious to those skilled in the art that the auxiliary attachment will function in response to any change that can be translated into a suitable decrease in damping of the indicating element, such as by electrical resistance or mechanical friction. When the damping is high, pointer 11 will always be clamped by safety cam 26 at or near its neutral position 12 or some other position primarily determined by the quantity being measured. When the damping is reduced, the pointer will oscillate and in conjunction with cam 26, sensing table 14 will detect pointer 11 at positions whose average will be different from that before the change in damping.

I claim:

1. In a control mechanism, a measuring element, an indicating element movable about a neutral position in response to the actual condition of said measuring element, means for damping the fluctuations of said indicating element to a low amplitude, control means responsive to the departure of said indicating element from its neutral position for varying the condition of said measuring element, means for operatively associating said last mentioned means with said indicating element intermittently, and an auxiliary element movable into engagement with said indicating element immediately prior to each association of said control means with said indicating element to clamp said indicating element in its position at that time, said auxiliary element being provided with a stepped engaging surface coextensive with the limits of fluctuation of said indicating element, said stepped surface being arranged to engage said indicating element on one side of its neutral position with less movement of said auxiliary element than that required to engage said indicating element on the other side of its neutral position.

2. In a control mechanism, a measuring element, an indicating element movable about a neutral position in response to the actual condition of said measuring element, means for damping the fluctuations of said indicating element to a low amplitude, control means responsive to the departure of said indicating element from its neutral position for varying the condition of said measuring element, means for operatively associating said last mentioned means with said indicating element intermittently, and an auxiliary element movable into engagement with said indicating element immediately prior to each association of said control means with said indicating element to clamp said indicating element in its position at that time, said auxiliary element comprising an engaging surface coextensive with the limits of fluctuation of said indicating element, one portion of said engaging surface adjacent and substantially equivalent to one-half of the path of fluctuation of said indicating element and located near to said indicating element than the remaining portion of said engaging surface so as to engage said indicating element on one side of its neutral position with less movement of said auxiliary element than that required to engage said indicating element on the other side of its neutral position.

3. The combination defined in claim 2 wherein said engaging surface is inclined with respect to the path of engaging movement of said auxiliary element.

4. The combination defined in claim 2 wherein said engaging surface comprises a stepped surface.

5. In a control mechanism, a measuring element, an indicating element movable in a plane about a neutral position in response to the actual condition of said measuring element, means for damping the fluctuations of said indicating element to a low amplitude, control means responsive to the departure of said indicating element from its neutral position for varying the condition of said measuring element, means for operatively associating said last mentioned means with said indicating element intermittently, a fixed stop member disposed on one side of the plane of movement of said indicating element, a movable clamping element disposed on the opposite side of said plane, means for moving said clamping element into engagement with said indicating element immediately prior to each association of said control means with said indicating element to clamp said indicating element against said stop member in its position at that time, said clamping element having an indicating element engaging surface coextensive with the possible path of movement of said indicating element, one portion of said engaging surface adjacent and substantially equivalent to one-half of the path of fluctuation of said indicating element and located nearer to said indicating element than the remaining portion of said engaging surface so as to engage said indicating element on one side of its neutral position with less movement of said clamping element than that required to engage said indicating element on the other side of its neutral position.

6. The combination defined in claim 5 wherein said engaging surface is inclined with respect to said plane of movement of said indicating element.

7. The combination defined in claim 5 wherein said engaging surface comprises a stepped surface.

8. In a temperature control mechanism, the combination of, an indicating element movable about a fixed neutral position in response to the actual temperature condition, control means responsive to the departure of said indicating element from said fixed neutral position and arranged to vary the existing temperature in accordance with the amount of movement thereof, means for operatively associating said last mentioned means with said indicating element intermittently, and an auxiliary element movable into engagement with said indicating element immediately prior to each association of said control means with said indicating element thereby momentarily clamping said indicating element in its position at that time, said auxiliary element being provided with a stepped engaging surface coextensive with the limits of fluctuation of said indicating elements, said stepped surface being arranged to engage said indicating element on the temperature-decreasing side of its neutral position with less movement of said auxiliary element than that required to engage said indicating element on the temperature-increasing side of said neutral position whereby the movement of said indicating element in response to a rise or fall in temperature allows a corresponding movement of said control means which acts to decrease or increase the existing temperature and return said indicating element to its neutral position.

9. In a control mechanism, a controlled element, an indicating element movable about a neutral position in response to the actual condition of said controlled element, means for damping the fluctuations of said indicating element to allow amplitude, control means responsive to the departure of said indicating element from its neutral position for varying the condition of said controlled element, means for operatively associating said last mentioned means with said indicating element intermittently, and an auxiliary element movable into engagement with said indicating element immediately prior to each association of said control means with said indicating element to clamp said indicating element in its position at that time, said auxiliary element being provided with a stepped engaging surface coextensive with the limits of fluctuation of said indicating element, said stepped surface being arranged to engage said indicating element on one side of its neutral position with less movement of said auxiliary element than that required to engage said indicating element on the other side of its neutral position whereby fluctuations of said indicating element due to decrease of damping thereof produce a unidirectional change in condition of said controlled element.

10. In a control mechanism, a controlled element, an indicating element movable about a neutral position in response to the actual condition of said controlled element, means for damping the fluctuations of said indicating element to a low amplitude, control means responsive to the departure of said indicating element from its neutral position for varying the condition of said controlled element, means for operatively associating said last mentioned means with said indicating element intermittently, and an auxiliary element movable into engagement with said indicating element immediately prior to each association of said control means with said indicating element to clamp said indicating element in its position at that time, said auxiliary element comprising an engaging surface coextensive with the limits of fluctuation of said indicating element, one portion of said engaging surface adjacent and substantially equivalent to one-half of the path of fluctuation of said indicating element and located nearer to said indicating element than the remaining portion of said engaging surface so as to engage said indicating element on one side of its neutral position with less movement of said auxiliary element than that required to engage said indicating element on the other side of its neutral position whereby fluctuations of said indicating element due to decrease of damping thereof produce of a undirectional change in condition of said controlled element.

11. In a control mechanism, a controlled element, an indicating element movable in a plane about a neutral position in response to the actual condition of said controlled element, means for damping the fluctuations of said indicating element to low amplitude, control means responsive to the departure of said indicating element from its neutral position for varying the condition of said controlled element, means for operatively associating said last mentioned means with said indicating element intermittently, a fixed stop member disposed on one side of the plane of movement of said indicating element, a movable clamping element disposed on the opposite side of said plane, means for moving said clamping element into engagement with said indicating element immediately prior to each association of said control means with said indicating element to clamp said indicating element against said stop member in its position at that time, said clamping element having an indicating element engaging surface coextensive with the possible path of movement of said indicating element, one portion of said engaging surface adjacent and substantially equivalent to one-half of the path of fluctuation of said indicating element and located nearer to said indicating element than the remaining portion of said engaging surface so as to engage said indicating element on one side of its neutral position with less movement of said clamping element than that required to engage said indicating element on the other side of its neutral position whereby fluctuations of said indicating element due to decrease of damping thereof produce a unidirectional change in condition of said controlled element.

LEONARD D. JAFFE.

REFERENCES CITED

The following references are of record in the file of this patent:

UNITED STATES PATENTS

| Number | Name | Date |
|---|---|---|
| 2,150,502 | Harrison et al. | Mar. 14, 1939 |
| 2,223,666 | Harrison | Dec. 3, 1940 |
| 2,331,182 | Gille | Oct. 5, 1943 |